US012752584B2

(12) United States Patent
Chetty et al.

(10) Patent No.: US 12,752,584 B2
(45) Date of Patent: Oct. 6, 2026

(54) SLIP CONTROL VIA ACTIVE SUSPENSION FOR OPTIMIZATION OF BRAKING AND ACCELERATING OF A VEHICLE

(71) Applicant: ClearMotion, Inc., Billerica, MA (US)

(72) Inventors: Aditya Chandrashekhar Chetty, Fremont, CA (US); Allen Chung-Hao Chen, San Jose, CA (US)

(73) Assignee: ClearMotion, Inc., Billerica, MA (US)

( * ) Notice: Subject to any disclaimer, the term of this patent is extended or adjusted under 35 U.S.C. 154(b) by 0 days.

(21) Appl. No.: 19/320,522

(22) Filed: Sep. 5, 2025

(65) Prior Publication Data

US 2026/0225421 A1 Aug. 6, 2026

Related U.S. Application Data

(63) Continuation of application No. 18/602,270, filed on Mar. 12, 2024, now Pat. No. 12,441,149, which is a (Continued)

(51) Int. Cl.

*B60G 17/016* (2006.01)
*B60G 17/018* (2006.01)
*B60G 17/019* (2006.01)

(52) U.S. Cl.

CPC ....... *B60G 17/0164* (2013.01); *B60G 17/018* (2013.01); *B60G 17/01908* (2013.01); *B60G 2400/102* (2013.01); *B60G 2400/204* (2013.01); *B60G 2400/206* (2013.01); *B60G 2400/208* (2013.01); *B60G 2400/252* (2013.01);

(Continued)

(58) Field of Classification Search

CPC .............. B60G 17/0164; B60G 17/018; B60G 17/01908; B60G 2400/102; B60G 2400/204; B60G 2400/206; B60G 2400/208; B60G 2400/252; B60G 2400/50; B60G 2401/16; B60G 2600/73

See application file for complete search history.

(56) References Cited

U.S. PATENT DOCUMENTS 5,682,980 A 11/1997 Reybrouck
6,125,318 A 9/2000 Zierolf (Continued)

FOREIGN PATENT DOCUMENTS

CN 101357648 A 2/2009
CN 104797479 A 7/2015

(Continued)

OTHER PUBLICATIONS

International Search Report and Written Opinion dated Apr. 29, 2020 in connection with International Application No. PCT/US2020/012153.

(Continued)

*Primary Examiner* — Toan C To

(74) *Attorney, Agent, or Firm* — Wolf, Greenfield & Sacks, P.C.

(57) ABSTRACT

System and method for improving braking efficiency by increasing the magnitude of a frictional force between a tire of a vehicle wheel and a road surface. Braking efficiency may be improved by controlling the normal force applied on the wheel, with an active suspension actuator, based on the wheel's slip ratio.

19 Claims, 6 Drawing Sheets

Related U.S. Application Data continuation of application No. 17/420,184, filed as application No. PCT/US2020/012153 on Jan. 3, 2020, now Pat. No. 11,964,528.

(60) Provisional application No. 62/787,839, filed on Jan. 3, 2019.

(52) U.S. Cl.
CPC ...... *B60G 2400/50* (2013.01); *B60G 2401/16* (2013.01); *B60G 2600/73* (2013.01)

(56) References Cited

U.S. PATENT DOCUMENTS

| | | | | |
|---|---|---|---|---|
| 6,223,108 | B1 | 4/2001 | Izawa et al. | |
| 6,278,930 | B1 * | 8/2001 | Yamada | B60T 8/17554 701/72 |
| 6,519,939 | B1 | 2/2003 | Duff | |
| 6,796,120 | B2 | 9/2004 | Franchet et al. | |
| 7,051,526 | B2 | 5/2006 | Geiger | |
| 7,206,678 | B2 | 4/2007 | Arduc et al. | |
| 7,233,236 | B2 * | 6/2007 | Lu | B60T 8/00 180/197 |
| 7,600,826 | B2 * | 10/2009 | Lu | G01G 19/086 303/146 |
| 7,883,546 | B2 | 2/2011 | Kazerooni et al. | |
| 7,894,958 | B2 * | 2/2011 | Tate | B60T 8/175 701/44 |
| 7,942,225 | B2 | 5/2011 | Carabelli et al. | |
| 8,776,961 | B2 | 7/2014 | Mori et al. | |
| 8,892,304 | B2 | 11/2014 | Lu et al. | |
| 9,108,484 | B2 | 8/2015 | Reybrouck | |
| 10,040,460 | B2 * | 8/2018 | Kasaiezadeh Mahabadi | B60W 40/107 |
| 10,300,760 | B1 | 5/2019 | Aikin et al. | |
| 11,964,528 | B2 * | 4/2024 | Chetty | B60G 17/0195 |
| 12,441,149 | B2 | 10/2025 | Chetty et al. | |
| 2004/0010383 | A1 * | 1/2004 | Lu | B60G 17/0162 702/41 |
| 2004/0059480 | A1 | 3/2004 | Hrovat et al. | |
| 2008/0190104 | A1 | 8/2008 | Bresie | |
| 2008/0275606 | A1 | 11/2008 | Tarasinski et al. | |
| 2009/0260935 | A1 | 10/2009 | Avadhany et al. | |
| 2010/0072760 | A1 | 3/2010 | Anderson et al. | |
| 2010/0230876 | A1 | 9/2010 | Inoue et al. | |
| 2010/0262308 | A1 | 10/2010 | Anderson et al. | |
| 2011/0066326 | A1 | 3/2011 | Kashiwamura et al. | |
| 2011/0288699 | A1 | 11/2011 | Jang et al. | |
| 2014/0195112 | A1 | 7/2014 | Lu | |
| 2014/0265168 | A1 | 9/2014 | Giovanardi et al. | |
| 2017/0361672 | A1 | 12/2017 | Ahmadian | |
| 2021/0155211 | A1 * | 5/2021 | Ding | B60T 8/171 |
| 2021/0197778 | A1 * | 7/2021 | Shi | B60T 8/1761 |
| 2021/0379954 | A1 * | 12/2021 | Bremmer | B60G 17/0165 |
| 2025/0042212 | A1 | 2/2025 | Chetty et al. | |

FOREIGN PATENT DOCUMENTS

| | | | |
|---|---|---|---|
| DE | 10 2010 023 434 | A1 | 12/2011 |
| GB | 2465836 | A | 6/2010 |
| JP | 2007-161055 | A | 6/2007 |
| WO | WO 02/20319 | A1 | 3/2002 |
| WO | WO 2010/066416 | A1 | 6/2010 |
| WO | WO 2011/154026 | A1 | 12/2011 |
| WO | WO 2011/159874 | A2 | 12/2011 |
| WO | WO 2014/145018 | A2 | 9/2014 |
| WO | WO 2020/120496 | A1 | 6/2020 |

OTHER PUBLICATIONS

International Preliminary Report on Patentability dated Jun. 16, 2021 in connection with International Application No. PCT/US2020/012153.

Alleyne, Improved vehicle performance using combined suspension and braking forces. Vehicle System Dynamics, 27 (1997), pp. 235-265.

* cited by examiner

SLIP CONTROL VIA ACTIVE SUSPENSION FOR OPTIMIZATION OF BRAKING AND ACCELERATING OF A VEHICLE

CROSS REFERENCE TO RELATED APPLICATIONS

This application is a continuation of U.S. application Ser. No. 18/602,270, filed on Mar. 12, 2024, which is a continuation of U.S. application Ser. No. 17/420,184, filed Jul. 1, 2021, which is a national stage filing under 35 U.S.C. § 371 of International Patent Application Serial No. PCT/US2020/012153, filed Jan. 3, 2020, which claims the benefit of U.S. Provisional Patent Application Ser. No. 62/787,839, filed Jan. 3, 2019, each of which is incorporated herein by reference in its entirety.

BACKGROUND

Braking of a moving vehicle generally relies on frictional forces present between the road surface and one or more tires of the vehicle. The magnitude of these frictional force, and therefore the distance and/or time required for a moving vehicle to come to a stop, may be influenced by a dynamic slip ratio of each wheel of the vehicle. Advanced vehicle functions, such as, for example, antilock braking systems, have been utilized to optimally control slip ratio during braking, thereby minimizing the distance and/or time required for a moving vehicle to come to a stop.

SUMMARY

Figure 1:
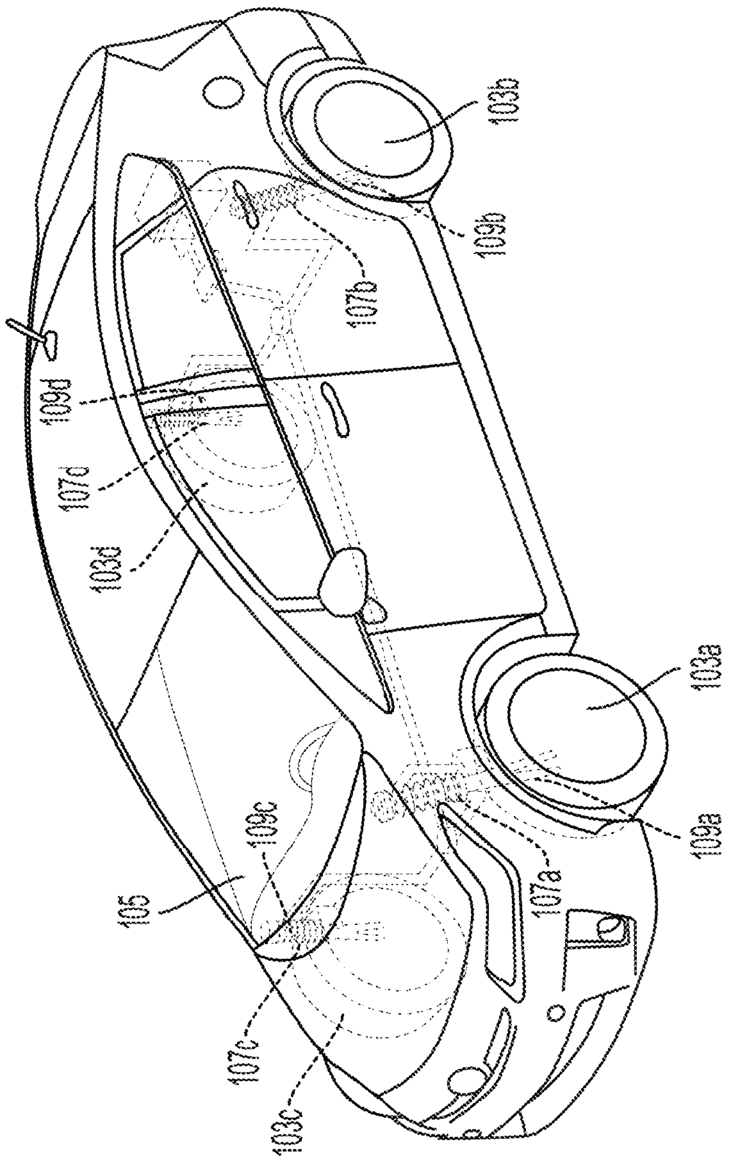
FIG. 1 illustrates an embodiment of a vehicle having a suspension system.

Various systems and methods are disclosed for controlling an active suspension system of a vehicle. In one aspect, a method for controlling an active suspension system of a vehicle is disclosed, wherein the active suspension system includes an actuator, and wherein the vehicle includes a wheel. In certain embodiments, the method includes: (a) determining (e.g., by a controller, by a set of one or more controllers) a slip ratio of the wheel of the vehicle (e.g, during a braking event); (b) based at least in part on the determined slip ratio, determining (e.g., by the controller, by the set of one or more controllers) a command (e.g., a command force, a command pressure, a command voltage, a command current); and (c) outputting the command (e.g., from the controller, from the set of one or more controllers) to the actuator of the active suspension system. In certain embodiments, the method further includes: (d) in response to the actuator receiving the command, producing an output force with the actuator of the active suspension system. In certain embodiments, producing the output force with the actuator includes applying, with the actuator, the output force (e.g., during the braking event) to a first portion of the vehicle. In certain embodiments, the first portion of the vehicle may be a wheel assembly that includes the wheel and/or a portion (e.g., a corner) of the vehicle body.

In certain embodiments, determining the slip ratio of the wheel includes detecting (e.g., using a wheel speed sensor) an angular velocity of the wheel of the vehicle; estimating an operating speed of the vehicle (e.g., using one or more of a localization sensor (e.g., GPS), an IMU, a wheel speed sensor); and, based at least in part on the sensed angular velocity and the sensed operating speed of the vehicle, determining the slip ratio of the wheel of the vehicle. In certain embodiments, the command is determined based at last in part on a product of the observed slip ratio times a slip gain. In certain embodiments, the slip gain may be dynamically set based at least in part on one or more vehicle parameters (e.g., wherein the one or more vehicle parameters includes at least one of, at least two of, or at least three of: a fluidic pressure of a brake cylinder of the vehicle or a rate of change thereof, a position of the acceleration pedal or a rate of change thereof, and/or a position of a brake pedal or a rate of change thereof). In certain embodiments, the slip gain may be determined by accessing a look-up table that specifies a plurality of values of the slip gain as a function of a vehicle parameter (e.g., wherein said vehicle parameter belongs to the set of one or more vehicle parameters).

In certain embodiments, the method includes measuring an aspect of vertical motion of a second portion of the vehicle (e.g., a second corner of the vehicle), and the command is determined based at least in part on the aspect of vertical motion. In certain embodiments, the aspect of vertical motion is an acceleration (e.g., in the vertical direction) of the second portion of the vehicle, while in other embodiments the aspect of mtion is a velocity (e.g., in the vertical direction) of the second portion of the vehicle. In certain embodiments, the first portion and second portion are the same, while in some embodiments they are different portions of the vehicle.

In certain embodiments, the command is further determined based at least in part on a product of the aspect of movement times a second gain. In certain embodiments, the second gain may be dynamically set based on one or more vehicle parameters. In these embodiments, the method includes measuring one or more vehicle parameters (e.g., wherein the one or more vehicle parameters includes at least one of, at least two of, or at least three of: a fluidic pressure of a brake cylinder of the vehicle or a rate of change thereof, a position of the acceleration pedal or a rate of change thereof, and/or a position of a brake pedal or a rate of change thereof); and determining a value of the second gain based at least in part on the one or more vehicle parameters). In certain embodiments, the value of the second gain may be determined by accessing a look-up table that specifies a plurality of values of the second gain as a function of a vehicle parameter (e.g., wherein said vehicle parameter belongs to the set of one or more vehicle parameters). In certain embodiments, application of the output force (e.g., to the first portion and/or to the second portion of the vehicle) results in a decrease in the slip ratio of the wheel.

In another aspect, a method for controlling an active suspension system of a vehicle is disclosed, wherein the vehicle has a wheel. In some embodiments, the method includes applying, with an actuator of the active suspension system associated with the wheel, a force to a portion of the vehicle (e.g., to a wheel assembly that includes the wheel, to a portion (e.g., a corner) of the vehicle body), wherein the applied force is determined (e.g., by a controller, by a set of controllers) based at least in part on an observed slip ratio of the wheel. In another aspect, a method for controlling an actuator of an active suspension system of a vehicle is disclosed. In some embodiments, the method includes estimating a slip ratio of a wheel of the vehicle at a given time; comparing the estimated slip ratio with a threshold slip ratio; and upon determining that the estimated slip ratio exceeds the threshold slip ratio: applying, with an actuator of the active suspension system, a force to the wheel of the vehicle to increase a normal load applied to the wheel. In certain embodiments, the threshold slip ratio exceeds the critical slip ratio. In other embodiments, the threshold slip ratio is substantially equal to the critical slip ratio. In certain embodiments, applying the force to the wheel of the vehicle includes extending the actuator. In certain embodiments, applying the force to the wheel of the vehicle thereby at least temporarily decreases the slip ratio of the wheel.

In yet another aspect, a method for controlling an active suspension system in a vehicle is disclosed, the method including: (a) while operating a vehicle, applying a braking force to a wheel of the vehicle to counteract rotation of the wheel, thereby resulting in an increase in a slip ratio of the wheel; and (b) subsequently applying, with an actuator of the active suspension system, a second force to a portion of the vehicle, wherein application of the second force results in a decrease in the slip ratio of the wheel. In certain embodiments, applying the second force results in an increase in a normal load applied to the wheel. In certain embodiments, the method further includes determining (e.g., by a controller, by a set of controllers) a slip ratio of the wheel; based at least in part on the determined slip ratio, determining (e.g., by the controller, by the set of controllers) a command for the actuator; outputting the command (e.g., from the controller, from the set of controllers) to the actuator; and in response to the actuator receiving the command: applying, with the actuator, the second force to the portion of the vehicle.

In yet another aspect, a method for controlling an active suspension system of a vehicle having a wheel is disclosed, the method including: (a) measuring (e.g., with an accelerometer) an aspect (e.g., an acceleration, a velocity, magnitude) of motion (e.g., of vertical motion) of a first portion of the vehicle (e.g., of a corner of a body of the vehicle); (b) measuring one or more vehicle parameters (e.g., wherein the one or more vehicle parameters includes at least one of, at least two of, at least three of, or at least four of: a fluidic pressure of a brake cylinder of the vehicle or a rate of change thereof, a position of the acceleration pedal or a rate of change thereof, a position of a brake pedal or a rate of change thereof, and/or a position of a steering wheel or a rate of change thereof); (c) determining, based at least in part on a set of one or more vehicle parameters, a value of a gain; (d) determining (e.g., with one or more controllers) a command based at least in part on a product of the aspect of motion times the gain; (e) outputting the command (e.g., from the one or more controller) to an actuator of the active suspension system; and (f) in response to the actuator receiving the command: applying, with the actuator of the active suspension system, an output force to a first portion of the vehicle (e.g., a wheel assembly that includes the wheel, a portion (e.g., a corner) of the vehicle body). In certain embodiments, determining the value of the gain based at least in part on the set of vehicle parameters includes: accessing a look-up table that specifies a plurality of values of the gain as a function of the one or more vehicle parameters.

In yet another aspect, a vehicle is disclosed that includes a wheel, an active suspension system that includes an actuator associated with the wheel (e.g., arranged to apply a force to a wheel assembly that includes the wheel), and a set of one or more controllers. In certain embodiments, the set of one or more controllers and the actuator may be configured to carry out any of the methods disclosed herein. In some embodiments, the vehicle may include a set of sensors that communicates with the controller.

In some embodiments, a vehicle is disclosed that includes the vehicle body; a plurality of wheels, including a first wheel associated with a first corner of the vehicle body and a second wheel associated with a second corner of the vehicle body; an active suspension system that includes a first actuator configured to apply a first force to the first wheel in response to a first command from a first controller, and a second actuator configured to apply a second force to the second wheel in response to a second command from a second controller; and a set of one or more controllers, wherein the set of one or more controllers includes the first controller, and wherein the set of one or more controllers is configured to: (a) determine a first slip ratio of the first wheel of the vehicle; (b) based at least in part on the first slip ratio, determine a first command force; and (c) command the first actuator to apply the first command force to the first wheel. In certain embodiments, the set of one or more controllers includes the second controller, and the set of controllers is further configured to: (a) determine a second slip ratio of the second wheel of the vehicle; (b) based at least in part on the second slip ratio, determine a second command force; (c) command the second actuator to apply the second command force to the second wheel. Alternatively or additionally, the set of one or more controllers may be further configured to determine vertical motion (e.g., jounce/rebound) of the first corner of the vehicle body relative to the first wheel; and based at least in part on the determined vertical motion, determine the first command force. In certain embodiments, the first controller and the second controller may be the same, or they may share some common hardware. In certain embodiments, they may be different controllers.

DETAILED DESCRIPTION

Braking of a moving vehicle utilizes friction between the vehicle's tires and the road surface to decelerate the vehicle. Optimized braking may be accomplished by increasing a magnitude of a frictional force that is present between a tire of the vehicle and a road surface on which the vehicle travels. The magnitude of the frictional force, sometimes referred to as traction, is the product of a coefficient of friction (p) times a normal load acting on the wheel (N). The coefficient of friction itself may depend on a variety of a factors, including a slip ratio of a corresponding wheel, which in turn may depend on the normal force applied to the wheel.

When the slip ratio of a given wheel is relatively low (e.g., substantially below a critical slip ratio) the wheel may rotate substantially in-sync with forward movement of the vehicle, and the frictional force between the corresponding tire and the road surface may have a relatively low magnitude that is primarily due to rolling resistance of the tire. As the slip ratio of the wheel increases, the magnitude of the frictional force may also increase, reaching a maximum at a critical slip ratio. As slip is increased beyond the critical slip ratio, the wheel of the vehicle may lock, resulting in a decrease in the magnitude of the frictional force as the locked wheel slides on the road surface. Therefore, in some embodiments, in order to minimize braking time and/or distance, the slip ratio of each wheel may be controlled so as to remain near but preferably below the critical level, thereby maximizing frictional (i.e. retarding) force.

The slip ratio of a wheel itself depends on a variety of factors including, for example, a braking force applied to the wheel as well as a normal force applied to the wheel. Many vehicles employ antilock braking systems, for example, which are designed to maintain slip at near critical levels by pulsing braking force to prevent over-slipping (or locking) of wheels during a braking event.

The inventors have recognized that in vehicles with an active suspension system, in some embodiments, the slip ratio of a wheel may be controllably varied during a braking event by controlling the magnitude of a normal load acting on one or more wheels of the vehicle. Such control over the normal load acting on a wheel may be utilized on its own or, or in conjunction with conventional antilock braking systems to achieve improve braking distance and/or time. In an exemplary use case, a slip ratio of each wheel of a vehicle may be monitored during a braking event, and the active suspension system may be controlled based on the slip ratio of each wheel. For example, if it is determined that a given wheel is experiencing deep slip (that is, a slip ratio that exceeds a given threshold value), the active suspension system may be actuated to increase the normal load acting on the given wheel (e.g., an actuator of the active suspension system may be extended, thereby applying a downward force at least on the particular wheel). By increasing the normal load acting on the given wheel, the slip ratio of the wheel may decrease so as to cause the wheel to approach the critical slip ratio. Additionally, the active suspension system may be used to reduce variation in normal load experienced by one or more wheels during the braking event, which may aid in increasing available traction at the tire's contact patch. Further, increasing the normal load acting on the given wheel may increase the magnitude of friction between the corresponding tire and the road surface. Particularly, by controlling the distribution of normal load between each wheel, the frictional or retarding force between each corresponding tire and the road surface may be controlled.

Additionally, due to vehicle dynamics, rapid braking of a vehicle may result in vertical motion (e.g., pitch or pitch oscillation) of a vehicle body that, in turn, may impact the distribution of normal load at each wheel of the vehicle. In certain embodiments, in addition to responding to a measured slip station of each wheel, the active suspension system may further be controlled based on observed vertical motion of the vehicle body. For example, an accelerometer may be placed near each corner of the vehicle body to measure vertical motion of the vehicle body, and the active suspension system may be controlled based on the measured motion. Alternatively, rather than using an accelerometer located near each corner, motion of the vehicle body may be determined using accelerometers located at two or three corners of the vehicle body, or near the front or back of the vehicle body. Alternatively or additionally, vertical motion of the vehicle body or of each corner may be predicted based on a vehicle maneuver or command, e.g. braking and/or steering command. For example, a sensor may measure position of the braking pedal. When a rapid change in position of the braking pedal is observed or when an increase in brake pressure is observed, in some embodiments, it may be predicted that the vehicle may rapidly decelerate, and a corresponding pitching motion may be expected. In some embodiments, control of the active suspension system, and the vertical force at one or more wheels, may therefore be based on both the measured slip ratio at each wheel of the vehicle, and the observed or expected vertical motion of the vehicle body.

Turning now to the figures, several non-limiting embodiments of various vehicles, suspension systems and suspension system components are now described in detail. It should be understood that the various systems, components, features, and methods described relative to these embodiments may be used either individually and/or in any appropriate combination as the disclosure is not limited to only the specific embodiments described herein.

FIG. 1 illustrates an exemplary vehicle having four wheels 103*a-d*, with each wheel associated with a respective corner of the vehicle (e.g., front left 103*a*, rear left 103*b*, front right 103*c*, and rear right 103*d*). Each wheel may also include a tire that contacts the road surface. The vehicle also includes a vehicle body 105. The vehicle body 105 may be coupled to the wheels 103*a-d* of the vehicle via a suspension system that includes a spring 107*a-d* (e.g., a coil spring, an air spring) and a force generating device 109*a-d* interposed between each wheel of the vehicle and a corresponding corner of the vehicle body. In the illustrated embodiment, each spring is shown in a concentric arrangement with respect to its corresponding force generating device. However, it is understood that any appropriate arrangement may be utilized. The weight of the vehicle body may result in a normal force being exerted on each of the four wheels. When the vehicle is stationary, the relative magnitudes of each normal force at each corresponding wheel may be determined by the weight distribution of the vehicle. When the vehicle is experiencing various maneuvers, e.g. braking, acceleration, or steering, vehicle dynamics may result in both vertical (i.e. out-of-plane) motion of the vehicle body (e.g., pitch, roll, heave) and in corresponding variations in the distribution of normal loads one or more wheels. For example, when rapid braking of the vehicle occurs, the front left and front right corner of the vehicle may drop (thereby compressing the corresponding suspension springs), while the rear left and rear right corners of the vehicle may lift (thereby extending the corresponding suspension springs). In this case, the normal force exerted on the front two wheels may increase (that is, the front wheels may be 'loaded') while the normal force exerted on the rear two wheels may decrease (that is, the rear wheels may be 'unloaded'). In a passive or sem-iactive suspension system, the force generating device may be a passive or semi-active damper, as are known in the art, that is configured to resist vertical motion of the vehicle body, e.g. by increasing damping.

In an active suspension system, each force generating device 109*a-d* may be an actuator. Various types of actuators as known in the art may be utilized, including without limitation hydraulic actuators, electromagnetic actuators, mechanical actuators, and/or electro-hydraulic actuators may be used. In a first mode of operation, the actuator may be configured to resist vertical motion of the vehicle body that occurs during braking, accelerating, or steering maneuvers (that is, it may function similar to a damper of a passive or semiactive suspension system). Additionally, in a second mode of operation, the actuator may be actively extended or compressed independently of dynamic forces imposed on the vehicle body. Active extension or compression of the actuator may be actively controlled by, e.g. an actuator controller and/or central controller, which may include one or more microprocessors.

The inventors have recognized that the active suspension system may be used to control the magnitude and/or time dependence of the normal load at one or more wheels in order to optimize the available traction at each wheel. For example, extension of one actuator of an active suspension system may result in an upward acceleration of an associated corner of the vehicle body and a corresponding downward force on an associated wheel, thereby at least temporarily increasing the normal load acting on the wheel. Additionally or alternatively, depending on the center of gravity of the vehicle body, it may be possible to statically vary the distribution of weight among the various wheels of the vehicle, by for example a twist maneuver, so that the loading of one or more wheels may be increased or decreased.

During operation of the vehicle, the wheels of the vehicle may rotate as the vehicle moves forward. In order to brake the vehicle (that is, to intentionally decelerate the vehicle), a braking force may be applied to one or more wheels of the vehicle in order to counteract rotation of those wheels. In most conventional vehicles, for example, a non-rotating brake pad may be pressed against a rotating brake disk, creating friction between the pad and the disk that counteracts rotation of the wheel. Alternatively or additionally, various regenerative braking systems are also known. In an exemplary regenerative braking system, a wheel of the vehicle may drive an electric generator, and a back EMF generated by rotation of the electric generator may counteract the rotation of the wheel.

In any case, the braking force applied to the wheel may inhibit free rotation of the wheel, resulting in the wheel being placed in a state of slip. The extent of slip experienced by a wheel may be referred to as a "slip ratio" of the wheel—when the slip ratio is zero, the wheel may be considered as rotating freely. When the slip ratio is 100, the wheel may be considered "fully locked" such that any rotation of the wheel is prevented (that is, as the vehicle body moves, a fully locked wheel essentially slides along the road surface without rotating).

Figure 2:
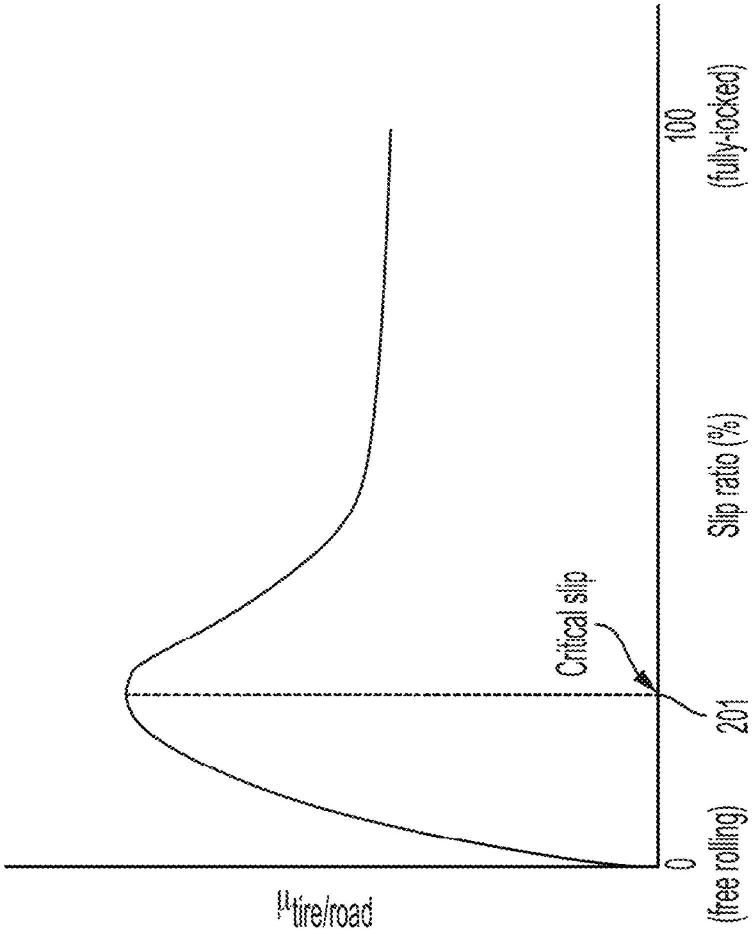
FIG. 2 illustrates a graph depicting an exemplary relationship between coefficient of friction and slip ratio of a wheel of a vehicle.

Each wheel generally includes a tire that contacts the road surface by means of a contact patch. Coefficient of friction between a given tire and the road surface may vary as a function of the slip ratio of the corresponding wheel, as illustrated in FIG. 2. FIG. 2 illustrates the coefficient of friction (denoted u) between the tire and road surface on the y-axis, as a function of the slip ratio of the associated wheel on the x-axis. When there is no slip, the slip ratio may be said to be zero and the frictional coefficient is substantially equal to the rolling frictional coefficient of the tire (a zero-slip state may be approached but generally not fully attained due to factors such as tire hysteresis). As used herein the phrase "substantially equal" is understood to mean within +/−10% of a value. As braking force is increased, the slip ratio may increase until a critical slip ratio 201 is reached. The critical slip ratio is understood to refer to the slip ratio of a wheel at which the coefficient of friction between the corresponding tire and road surface is at a maximum, and may depend on a number of factors including the road surface and the tire characteristics. Further increasing the slip ratio beyond the critical slip ratio 201 results in a decrease in the coefficient of friction and a corresponding decrease in the available traction, as the wheel may begin to enter a state of deep slip. It is understood that the graph depicted in FIG. 2 is exemplary for a single wheel, and actual behavior may vary based on a variety of conditions, including type of road surface, tire characteristics, loading of the vehicle, etc.

Inventors have recognized that in order to optimize braking time and/or distance (that is, the time required to bring the vehicle to a complete stop and/or the distance required to bring the vehicle to a complete stop), it may be desirable to control the slip ratio of one or more wheels during a braking event. As used herein the phrase "braking event" is understood to mean an event where the braking system of the vehicle is activated by, for example, depressing the brake pedal, or by otherwise applying a braking force to one or more wheels of the vehicle. The slip ratio of a given wheel may also be a function of the normal load acting on that wheel during a braking event. The inventors have recognized that it may be possible to control the slip ratio during a braking event by using an active suspension system of a vehicle to modulate the normal load acting on one or more wheels. Similarly, acceleration events may also increase the likelihood that a wheel will experience deep slip, and acceleration time and/or distance (that is, the time required to accelerate the vehicle to a given speed and/or the distance required to accelerate the vehicle to the given speed) may be optimized by controlling the slip ratio of each wheel during an acceleration event, in order to increase traction between the tires of the vehicle and the road surface during rapid acceleration. As used herein the phrase "acceleration event" is understood to mean an event where the propulsion system of the vehicle is used to cause the vehicle to increase speed in the forward direction.

In an exemplary embodiment, the slip ratio of each wheel of the vehicle may be monitored during a braking event and/or an acceleration event. As would be recognized by one of ordinary skill in the art, slip ratio generally refers to differences between observed angular velocity of the wheel and the expected angular velocity based on vehicle speed if pure rolling motion were present. Slip ratio may be expressed as a ratio or a percentage. An exemplary definition of slip ratio is given in SAE J670, though one of skill would recognize that other definitions exist and the disclosure is not so limited. Various methods of monitoring slip ratio of a wheel are known in the art. In one exemplary method, slip ratio of a given wheel may be determined by collecting information from (a) a wheel speed sensor configured to determine the angular velocity of a given wheel, and (b) a vehicle speed sensor configured to determine the operating speed of the vehicle. Based on geometric considerations (e.g., a rolling radius of the wheel), the slip ratio of the wheel at a given time may be determined according to methods known in the art. It should be understood that there are other methods for computing slip ration as the disclosure is not so limited.

In an exemplary embodiment, when the observed slip ratio of the wheel exceeds a threshold value, an actuator of the active suspension that is associated with the wheel may be extended to modulate normal force at the wheel. In certain embodiments, the threshold value may be substantially equal to the critical slip ratio. In other embodiments, the threshold value may exceed the critical slip ratio. It should be understood that the threshold slip may have any appropriate value between 0 and 100, as the disclosure is not so limited. Extension of the actuator may result in an upward force being applied to a corresponding corner of the vehicle body and an associated downward force being applied to the corresponding wheel, thereby at least temporarily increasing the normal load being exerted onto the wheel. As the normal load exerted onto the wheel increases, a decrease in its slip ratio may occur (e.g., thereby bringing the slip ratio of the wheel closer to the critical slip ratio). Therefore, by controlling each actuator of the active suspension system based at least partly on an observed slip ratio of a respective wheel of the vehicle, it may be possible to control the slip ratio of one or more wheels such that braking distance and/or time may be optimized.

Figure 3:
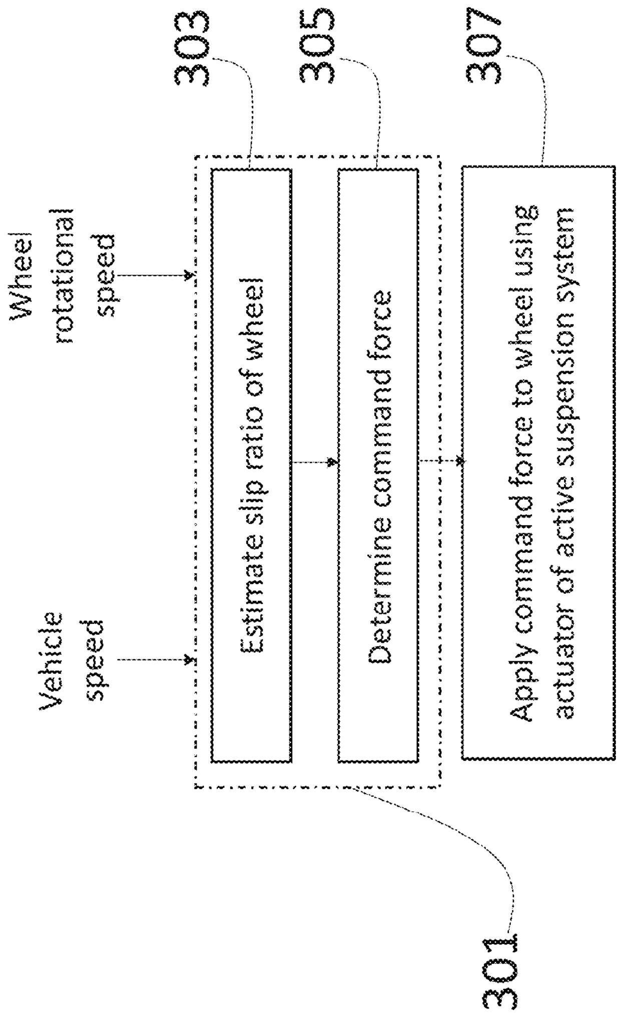
FIG. 3 illustrates a method for determining a command force in an active suspension system.

FIG. 3 illustrates a flow chart of an exemplary method of controlling an actuator of an active suspension system of a vehicle based at least in part on a slip ratio of a wheel of the vehicle. In certain embodiments, a controller 301 receives input corresponding to a vehicle speed and a rotational speed of the wheel. The controller 301 may include a microprocessor (e.g., general purpose processor or an ASIC). In a first step 303, the approximate slip ratio of the wheel of the vehicle may be determined, e.g. based on the vehicle speed and the rotational speed of the wheel. In a second step 305, based at least in part on the determined slip ratio, the controller may determine a command force. The command force may additionally be determined based on other parameters, including, for example, any measured vertical motion of the vehicle body. In a subsequent step 307, the command force may then be output to the actuator of the active suspension system. The actuator may be arranged to apply a force on the wheel, and in response to receiving the command the corresponding actuator may apply the command force to the wheel. In certain embodiments, the force may be applied by extending or contracting a length of the actuator, as is known in the art for linear actuators.

Figure 4:
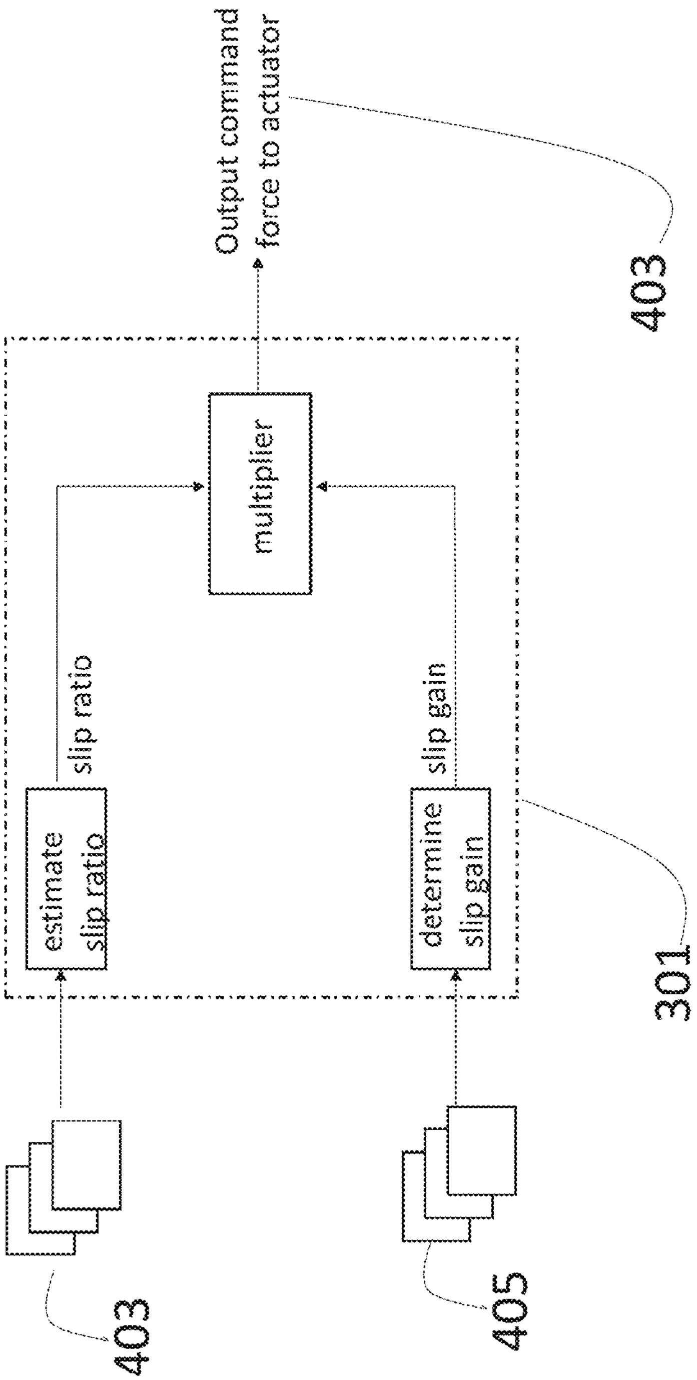
FIG. 4 illustrates a method for determining a command force in an active suspension system.

FIG. 4 illustrates a second exemplary method of controlling an actuator of an active suspension system based at least in part on a slip ratio of a wheel of a vehicle. In the illustrated method, the controller 301 receives input from a first set of one or more sensors 403. In certain embodiments, the first set of one or more of sensors 403 may include a wheel speed sensor configured to determine the angular velocity of a wheel of the vehicle, and a vehicle speed sensor configured to determine the operating speed of the vehicle. In certain embodiments, as is known in the art, the vehicle speed sensor may be based on data from one or more individual sensors, including, for example, a localization system (e.g., a GPS), an IMU, and one or more wheel speed sensors. Based on the input from the first set of one or more of sensors, the approximate slip ratio of the wheel of the vehicle at a given time may be estimated. In certain embodiments, the controller may determine the command force based at least in part on a product of the determined slip ratio times a slip gain. In certain controller configuration, a higher value of a gain signifies that the system responds faster and/or more aggressively to an underlying change of state, whereas a lower value the gain signifies that the system responds more slowly and/or less aggressively to an underlying change of state. That is, a value of the slip gain may represent the sensitivity of the active suspension system to observed changes in slip ratio of the wheel of the vehicle. The inventors have recognized that it may be desirable to control the active suspension system such that, in circumstances associated with increased likelihood of deep slip of a wheel occurring, the active suspension system may be tuned to be more sensitive to changes in observed slip ratio. In certain embodiments, the controller may dynamically vary the slip gain based on the likelihood of one or more wheels of the vehicle experiencing a state of deep slip or locking. For example, when rapid braking or rapid acceleration of the vehicle is commanded, the likelihood of one of the wheels experiencing a state of deep slip (e.g., due to locking or burnout) increases, and—in response to the increase in likelihood—the slip gain of the control system may be increased.

In certain embodiments, therefore, the controller 301 may receive input from a second set of one or more sensors 405. In certain embodiments, the second set of sensors 405 may monitor one or more vehicle parameters that correspond to a rapid braking or rapid acceleration maneuver. In various embodiments, these one or more vehicle parameters may include: a pressure of the master brake cylinder, other pressure in the brake system, or a rate of change thereof; a position of the acceleration pedal or a rate of change thereof; and/or a position of the brake pedal or a rate of change thereof. In these embodiments, the controller 301 may receive input from the second set of one or more sensors 405, wherein the set of one or more sensors includes at least one of, at least two of, or three of: a pressure transducer configured to detect pressure of the master brake cylinder or other pressure in the brake system, a sensor configured to detect a position of the acceleration pedal or changes thereof, and a sensor configured to detect a position of the gas pedal or changes thereof. The controller 301 may then determine a value for the slip gain based at least in part on the input from the set of sensors. In this way, the controller may dynamically vary the value of the slip gain based on the set of one or more vehicle parameters. In certain embodiments, the controller may have access to a look-up table that specifies a plurality of values for the slip gain as a function of the set of one or more vehicle parameters. In certain embodiments, the look-up table may be stored in computer readable memory (e.g., non-transitory computer readable memory) that is accessible by the controller. In certain embodiments, the estimated slip ratio may be multiplied by the determined slip gain in order to determine the command force that is output to the actuator.

In certain embodiments, the controller may receive input from a plurality of wheel speed sensors (e.g., from four wheel speed sensors), wherein each wheel speed sensor is configured to determine the angular velocity of a different wheel of the vehicle. In these embodiments, the controller may determine approximate slip ratios of each wheel of the vehicle and, based at least in part on these approximate slip ratios, may determine a plurality of command forces, wherein each command force is associated with one actuator of the active suspension system. In various embodiments, as would be recognized by one of ordinary skill in the art, the functions ascribed to a single controller herein may be distributed among a plurality of controllers.

Figure 5:
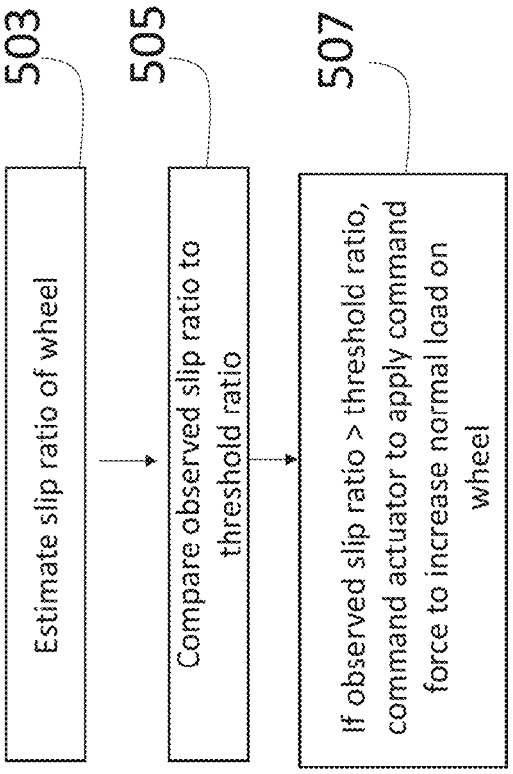
FIG. 5 illustrates a method for determining a command force in an active suspension system.

FIG. 5 illustrates another exemplary method of controlling an actuator of an active suspension system based at least in part on a slip ratio of a wheel of a vehicle. In the illustrated embodiment, in a first step 503 a slip ratio of the wheel is estimated as is known in the art (e.g., based on vehicle speed and rotational speed of the wheel). In certain embodiments, in a subsequent step 505 the estimated slip ratio may be compared to a threshold slip ratio. In various embodiments, the threshold slip ratio may be substantially equal to the critical slip ratio, or the threshold slip ratio may exceed the critical slip ratio. In certain embodiments, upon determining that the observed slip ratio of the at least one wheel of the vehicle exceeds the threshold slip ratio at step 507, the controller may command a corresponding actuator to apply a command force that results in an increase in a normal load applied to the wheel at 507. In certain embodiments, the command force may be applied by extending a length of the actuator at an appropriate rate. By increasing the normal load, the slip ratio of the wheel may be decreased such that it approaches the critical slip ratio, thereby increasing the available traction at the wheel.

During a braking event, the vehicle body may pitch forward due to vehicle dynamics understood in the art. It may be desirable to counteract, mitigate, or eliminate this pitch motion, and/or to mitigate any oscillating pitch motions of the vehicle body during a braking event, using one or more actuators of the active suspension system. FIG.

Figure 6:
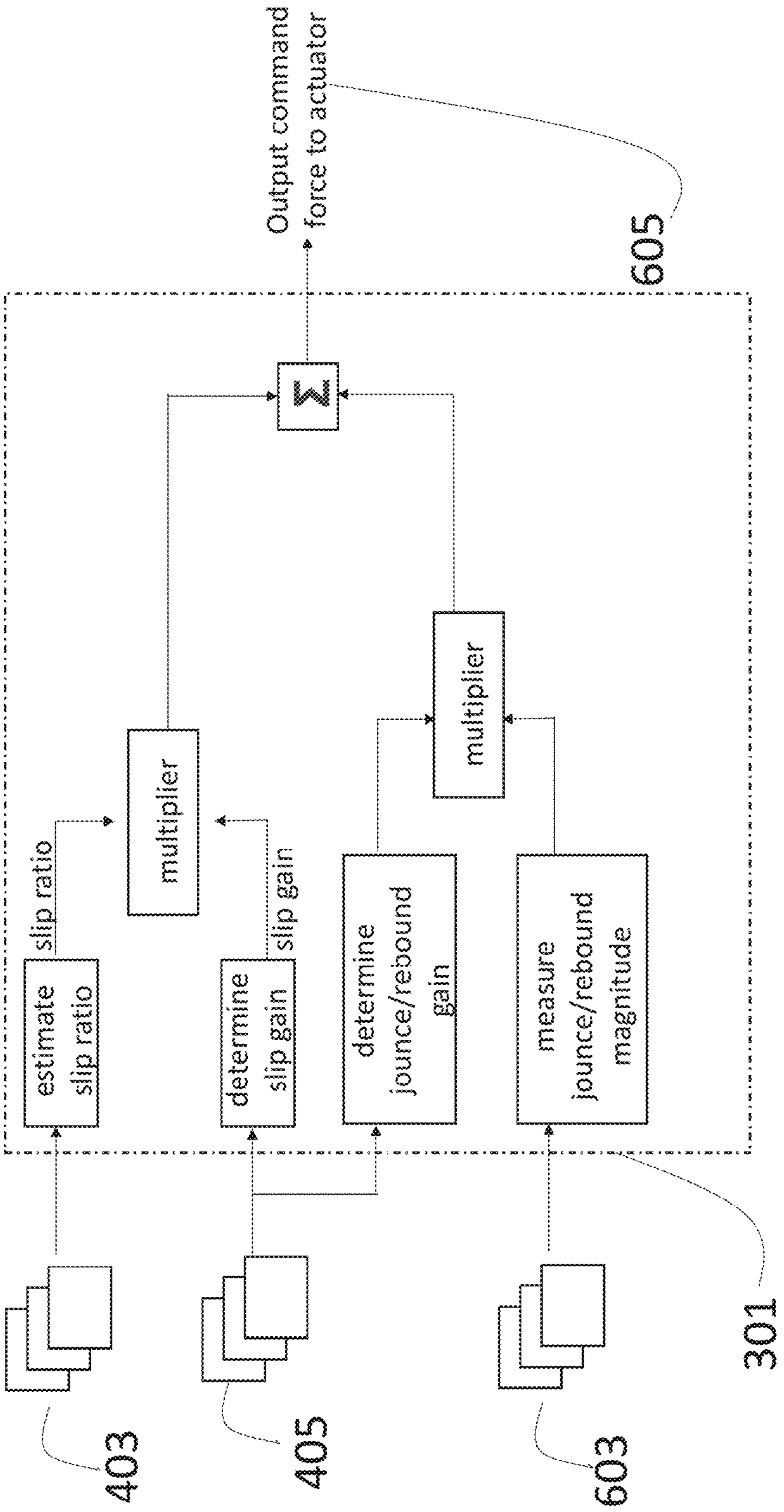
FIG. 6 illustrates a method for determining a command force in an active suspension system.

6 illustrates an embodiment of active suspension control in which the command force is based at least in part on both: (i) a measured slip ratio of a wheel (as described above), and (ii) an observed vertical motion of an associated corner of the vehicle body relative to the wheel, referred to herein as either jounce or rebound. The illustrated embodiment of FIG. 6 is similar to that of FIG. 4, in that a first set of one or more sensors 403 may be used to estimate slip ratio of the wheel of the vehicle, and a second set of one or more sensors 405 may be used to determine an optimal slip gain. In addition, in certain embodiments, the controller 301 may receive input from a set of one or more motion sensors 603. The set of one or more motion sensors 603 may include an accelerometer and/or a suspension position sensor configured to measure jounce or rebound of the corner of the vehicle body associated with the wheel. Based on input from the set of motion sensors 603, the controller may determine a magnitude of jounce or rebound that the corner of the vehicle body is experiencing. In certain embodiments, the input from the set of one or more motion sensors, and/or the determined magnitude of jounce or rebound as a function of time, may be filtered (e.g., low pass or band pass filtered) in order to, for example, remove noise and/or drift from the signal. In certain embodiments, a command force output to the actuator may be based at least in part on both the observed slip ratio of the wheel, and on observed relative vertical motion (e.g., the jounce/rebound) of the associated corner of the vehicle body. Particularly, in certain embodiments the command force may be based at least in part on both a product of the slip ratio times the slip gain, and on a product of the jounce or rebound magnitude times a jounce or rebound gain. It is understood that, in various embodiments, the command force may be further based on other parameters (e.g., vehicle loading, operating speed, road surface characteristics, driving mode, operator input, vehicle occupant input, etc.) in addition to those described herein.

Analogous to the previous discussion of slip gain, a value of the jounce or rebound gain may represent the sensitivity of the active suspension system to observed motion of the corner of vehicle body. A larger value for jounce gain, for example, may signify that the active suspension system will respond faster and/or more aggressively to an observed jounce/rebound that when a smaller value for jounce/rebound gain is utilized. The inventors have recognized that it may be desirable to control the active suspension system such that, in circumstances for which jounce or rebound of a corner of the vehicle is highly likely to occur, the active suspension system is tuned to be more sensitive to such jounce or rebound. In certain embodiments, therefore, the controller may dynamically vary the jounce or rebound gain as a function of the likelihood of one or more corners of the vehicle body experiencing jounce or rebound greater than a threshold value. For example, when rapid braking or rapid acceleration of the vehicle is commanded, the likelihood of one or more corners of the vehicle experiencing jounce or rebound increases, and, in response to the increase in likelihood, it may be desirable to increase the jounce or rebound gain used by the control system of the active suspension system.

In certain embodiments, therefore, the controller 301 may receive input from a second set of one or more sensors 405. In certain embodiments, the second set of sensors 405 may monitor one or more vehicle parameters that correspond to a rapid braking or rapid acceleration maneuver. In various embodiments, these one or more vehicle parameters may include: a pressure of the master brake cylinder or a rate of change thereof, a position of the acceleration pedal or a rate of change thereof, and/or a position of the brake pedal or a rate of change thereof. In these embodiments, the controller may receive input from a set of one or more sensors, wherein the set of one or more sensors includes at least one of, at least two of, or three of: a pressure transducer configured to detect pressure of the master brake cylinder, changes thereof and rates of change thereof, a sensor configured to detect a position of the acceleration pedal, changes thereof, or rates of change thereof, and a sensor configured to detect a position of the gas pedal, changes thereof, or rates of change thereof. The controller may then determine a value for the jounce or rebound gain based at least in part on the input from the set of motion sensors. In this way, the controller may dynamically vary the value of the jounce or rebound gain based on the one or more vehicle parameters. In certain embodiments, the controller may have access to a look-up table that specifies a plurality of values for the jounce or rebound gain as a function of the set of one or more vehicle parameters. In certain embodiments, the look-up table may be stored in computer readable memory (e.g., non-transitory computer readable memory) that is accessible by the controller. In certain embodiments, a product of the observed jounce/rebound magnitude times the determined jounce/rebound gain may be added to the product of the estimated slip ratio of the wheel times the determined slip gain in order to determine the command force that is output to the actuator 605.

In various embodiments, as would be recognized by one of ordinary skill in the art, the functions ascribed to a single controller herein may be distributed among a plurality of controllers. For example, in certain embodiments, a plurality of controllers may be utilized, wherein each controller is associated with a different corner of the vehicle body, different actuator of the active suspension system, and/or different wheels of the vehicle. In these embodiments, each controller may receive input from a single associated wheel speed sensor and body accelerometer, and may determine a single command force that is associated with one actuator of the active suspension system. Alternatively, a central controller may be utilized and may receive signals from a plurality of accelerometers (e.g., each associated with one corner of the vehicle body) and a plurality of wheel speed sensors (e.g., each associated with one wheel of the vehicle body). The central controller may then determine a plurality of command forces, each associated with one actuator of the active suspension system, and may command each actuator to apply a respective command force. Alternatively, slip ratio of a wheel and/or other vehicular parameters may be determined by a vehicle controller that is shared among several vehicular systems (e.g., ABS, stability control, etc.) and may be communicated to a second controller that is specific to the active suspension system.

The invention claimed is:

1. A method of operating a vehicle, the method comprising:

determining a value of a parameter associated with a braking command of the vehicle;

based on the value of the parameter, predicting vertical motion of a body of the vehicle associated with a braking event; and using an active suspension actuator of the vehicle to apply a force to a portion of the vehicle to mitigate the predicted vertical motion.

2. The method of claim 1, wherein the vertical motion of the body of the vehicle is pitch motion.

3. The method of claim 1, wherein the parameter is a brake pressure.

4. The method of claim 1, wherein the brake pressure is a master brake cylinder pressure.

5. The method of claim 1, wherein the parameter is a rate of change of a brake pressure.

6. The method of claim 1, wherein the parameter is a brake pedal position.

7. The method of claim 1, wherein the parameter is a rate of change of a brake pedal position.

8. A method of operating a vehicle, the method comprising:

predicting expected vertical motion of a body of the vehicle;

determining a slip ratio of a wheel of the vehicle; and based on both the expected vertical motion of the body of the vehicle and the slip ratio of the wheel, controlling an active suspension actuator to apply a force on the vehicle body to mitigate the expected vertical motion.

9. The method of claim 8, wherein the expected vertical motion of the body of the vehicle is pitch motion.

10. The method of claim 8, wherein the expected vertical motion of the body of the vehicle is pitch oscillation.

11. The method of claim 8, wherein the expected vertical motion is predicted based on a braking command of the vehicle.

12. The method of claim 8, wherein the expected vertical motion is predicted based on a steering command of the vehicle.

13. The method of claim 11, wherein the braking command comprises a brake pedal position.

14. The method of claim 11, wherein the braking command comprises a rate of change of brake pedal position.

15. The method of claim 11, wherein the braking command comprises a brake pressure.

16. The method of claim 15, wherein the brake pressure is a master brake cylinder pressure.

17. The method of claim 11, wherein the braking command comprises a rate of change of brake pressure.

18. The method of claim 8, wherein controlling the active suspension actuator comprises determining a command based at least in part on a product of the slip ratio and a slip gain.

19. A method of operating a vehicle, the method comprising:

determining a slip ratio of a wheel of the vehicle;

determining a magnitude of jounce or rebound of a body of the vehicle relative to the wheel; and controlling an active suspension actuator by determining a command based at least in part on a product of the slip ratio and a slip gain and on a product of the magnitude of jounce or rebound and a jounce or rebound gain.

* * * * *